(12) United States Patent
Jacob

(10) Patent No.: US 6,251,021 B1
(45) Date of Patent: Jun. 26, 2001

(54) DRIVE ASSEMBLY WITH A CONSTANT VELOCITY FIXED JOINT AND A DAMPING ELEMENT

(75) Inventor: Werner Jacob, Frankfurt (DE)

(73) Assignee: GKN Lobro GmbH (DE)

(*) Notice: Subject to any disclaimer, the term of this patent is extended or adjusted under 35 U.S.C. 154(b) by 0 days.

(21) Appl. No.: 09/350,239

(22) Filed: Jul. 9, 1999

(30) Foreign Application Priority Data

Jul. 10, 1998 (DE) .............................................. 198 31 015

(51) Int. Cl.[7] .............................. F16D 3/18; F16C 3/035
(52) U.S. Cl. .................... 464/145; 464/167; 464/906; 464/180
(58) Field of Search ...................... 464/106, 139, 464/140, 141, 143, 145, 146, 162, 167, 180, 906, 89

(56) References Cited

U.S. PATENT DOCUMENTS

| | | | |
|---|---|---|---|
| 3,817,057 | * | 6/1974 | Orain ..................................... 464/111 |
| 4,405,032 | * | 9/1983 | Welschof ............................... 464/89 |
| 5,334,096 | * | 8/1994 | Iwao ...................................... 464/146 |
| 5,435,785 | | 7/1995 | Foulquier et al. . |
| 5,624,318 | * | 4/1997 | Jacob et al. .......................... 464/140 |
| 5,725,432 | | 3/1998 | Konegen et al. . |
| 5,899,814 | * | 4/1999 | Murillo ................................. 464/140 |
| 5,911,629 | * | 6/1999 | Reynolds .............................. 464/80 |

FOREIGN PATENT DOCUMENTS

| | | |
|---|---|---|
| 0 284 647 A1 | 10/1988 | (EP) . |
| 2 076 936 | 12/1981 | (GB) . |
| 2 212 882 | 8/1989 | (GB) . |
| 2 311 117 | 9/1997 | (GB) . |

\* cited by examiner

*Primary Examiner*—Lynne H. Browne
*Assistant Examiner*—Kenneth Thompson

(57) ABSTRACT

The invention relates to a drive assembly comprising a constant velocity fixed joint 1 with an outer part 4 provided with a flange 7, and a damping element 3 in the form of a ring. The damping element 3 is arranged between the flange 7 and, respectively, the flange-like portion of a cover 19 closing the outer part 4 and the attaching part 20. The damping element 3 includes an aluminum material whose modulus of elasticity greatly deviates from that of the outer part 4, so that any structure-borne sound vibrations originating from the drive end, for example from a drive unit of a motor vehicle, cannot be transmitted from the attaching part 20 into the driveline which includes the constant velocity fixed joint 1. In this way, vehicle comfort is improved.

11 Claims, 2 Drawing Sheets

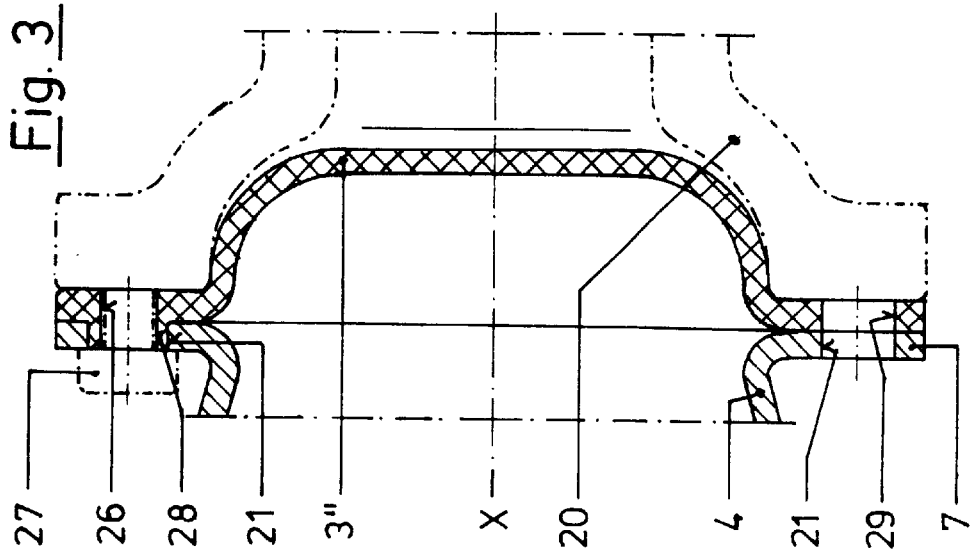
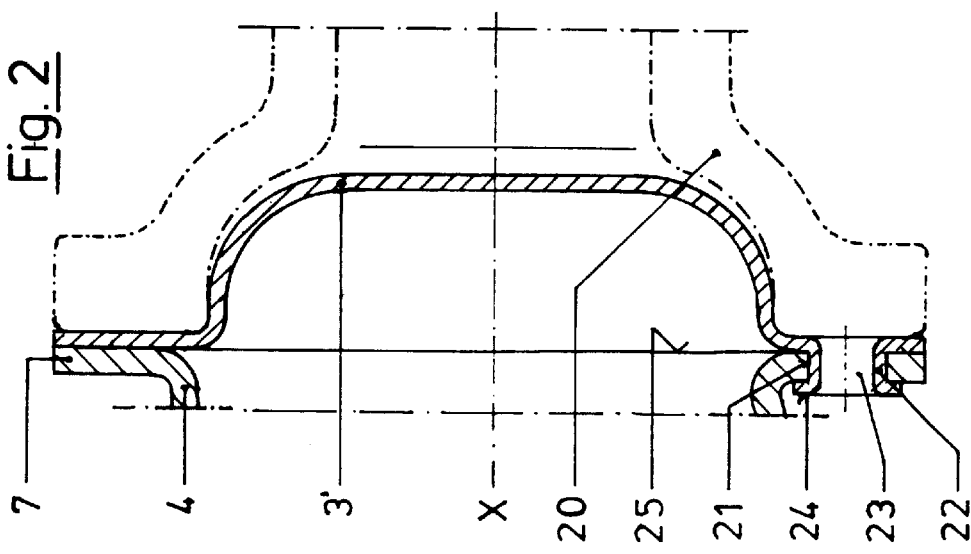

DRIVE ASSEMBLY WITH A CONSTANT VELOCITY FIXED JOINT AND A DAMPING ELEMENT

BACKGROUND OF THE INVENTION

The invention relates to a drive assembly which comprises a constant velocity fixed joint and means for attaching same to a driving or driven attaching part.

Constant velocity fixed joints are known in various designs. For example, DE 40 31 820 C2 describes a constant velocity fixed joint whose outer part comprises a first and a second open end. The device comprises a cavity which is centered on the longitudinal outer part axis and which is open towards both open ends. Furthermore, the outer part, in its inner face delimiting its cavity, is provided with two types of outer running grooves which are arranged in a regular sequence around the longitudinal outer part axis in planes containing the longitudinal outer part axis. The first outer running grooves start from the first open end and extend towards the second open end in a curve-like and undercut-free way. The second outer running grooves start from the second open end and extend towards the first open end in a curve-like and undercut-free way. In the cavity of the outer part, there is arranged an inner part. The inner part comprises a longitudinal inner part axis and a spherical outer face in which there are provided first and second inner running grooves which are positioned opposite the first and second outer running grooves and which, with reference to the longitudinal inner part axis, are arranged in planes containing the longitudinal inner part axis. The first inner running grooves are positioned opposite the first outer running grooves in such a way that they form pairs, with the first inner running grooves starting from the first open end and extending towards the second open end in a curve-like and undercut-free way. The second inner running grooves are arranged opposite the second outer running grooves and form pairs therewith, while starting from the second open end and extending towards the first open end in a curve-like and undercut-free way. Between the inner face of the outer part and the spherical outer face of the inner part, there is arranged a cage whose spherical outer face comprises play relative to the inner face of the outer part. The cage comprises a cylindrical bore which is held with play relative to the spherical outer face of the inner part. The cage comprises radial apertures which are distributed in accordance with the pairs of inner running grooves and outer running grooves and constitute windows and guide balls which, for the transmission of torque between the outer part and inner part, each engage a pair of outer and inner running grooves. The centers of all balls are held in a plane containing the window centers.

Such joints are intended to be used in the driveline provided for driving the wheels of a motor vehicle. They can be used in either propeller shafts or in sideshafts. Sideshafts extend from the axle drive to the driven wheels. For example, they connect the output ends of the rear axle differential with the driven wheel hubs of the wheels. Propeller shafts serve to transmit the drive from the gearbox output of the front wheel drive unit to the rear axle differential associated with the rear axle.

As far as propeller shafts are concerned, a number of different designs are used. They may comprise, for example, two joints which are arranged at the end of a shaft connecting same and which serve to be connected to the gearbox output in front and to the drive input at the rear. However, it is also possible to use a driveline consisting of several portions, for example two portions between which there is provided a bearing. Normally, at the ends of the propeller shaft, i.e. towards the gearbox output and the drive input, there are arranged universal joints. It is also possible for a universal joint to be provided in the central region. However, a constant velocity plunging joint can also be provided in said central region; for instance see the book by Prof. Dipl.-Ing. Jörnsen Reimpell: Fahrwerktechnik 1, $5^{th}$ edition, Vogel-Verlag, page 285, Figure 3.1/21.

The drive unit of the motor vehicle generates vibrations which, in prior art assemblies, are transmitted to the propeller shaft in the form of movement vibrations and structure-borne sound. In this context it has to be taken into account that propeller shafts rotate at high speeds. In addition, changing torque values and rotational speeds constantly occur during the transmission of the rotational movement.

SUMMARY OF THE INVENTION

It is an object of the invention to propose a drive assembly which achieves smoother running characteristics of the vehicle in order to meet the ever increasing demands in respect to comfort.

In accordance with the invention, the objective is achieved by providing a drive assembly comprising a constant velocity fixed joint having an outer part which comprises a longitudinal outer part axis, a cavity and, in the cavity, outer running grooves extending in planes which are distributed around the longitudinal outer part axis and contain said axis. The outer part further comprises a flange to be connected to a driving or driven attaching part. The assembly also includes an inner part which is arranged in the cavity of the outer part and which, in its outer face, comprises inner running grooves which are positioned opposite the outer running grooves and which are arranged in planes which are distributed around the longitudinal inner part axis and contain said axis. The assembly further comprises a cage which is arranged between the outer part and the inner part. The cage is provided with windows distributed in accordance with the pairs of opposed outer and inner running grooves. Balls are also included which are guided in the windows of the cage and each extend into an associated outer running groove and inner running groove. Each of the above-mentioned components consist of a ferrous material. The above drive assembly, furthermore, comprises a damping element which consists of a material whose modulus of elasticity is smaller than that of the ferrous material and which is arranged in front of the flange of the outer part of the constant velocity fixed joint.

The advantage of the present embodiment is that by including a damping element whose modulus of elasticity is smaller than that of the material of which the components of the constant velocity fixed joint are produced and, together with the constant velocity fixed joint, vibrations are damped. The damping element is arranged between the flange of the outer part of the constant velocity fixed joint and the attaching part of the driving or driven component. It is also possible to arrange a cap therebetween which closes the outer part, for example.

According to a further embodiment of the invention, it is proposed that the damping element itself is provided in the form of a cover closing the outer part. However, it is also possible to provide the damping element in the form of a ring and to provide a separate cover.

A particularly advantageous damping effect is achieved if the modulus of elasticity of the material of which the damping element is made is less than 50% of the modulus of elasticity of the ferrous material used for producing the outer part and the remaining components of the constant velocity fixed joint, i.e. the inner part, the cage, and the balls. A preferred material for the damping element is an aluminum material. The damping element can also be produced from plastics, in which case it is important to select a design which reduces the flow of the plastic material. This can be achieved, for example, by using a plastic material with embedded fibers, preferably carbon fibers. Furthermore, a rubber ring reinforced by inserts, such as steel inserts, is advantageous.

In addition, such a drive assembly can actively prevent the transmission of movement vibrations from the drive unit and the component to be driven if the constant velocity fixed joint is additionally associated with a plunging unit with rolling contact members which engage guiding grooves. Such rolling contact member displacing elements comprise a friction coefficient which ranges between 3 and $4\mu$.

BRIEF DESCRIPTION OF THE DRAWINGS

Preferred embodiments of the invention are diagrammatically illustrated in the drawing and explained in greater detail with references thereto.

FIG. 2 shows another embodiment of the damping element. It is provided in the form of a cover made of an aluminum material.

FIG. 3 is another embodiment of the cover having been produced from plastics.

DETAILED DESCRIPTION OF THE PREFERRED EMBODIMENT

Figure 1:
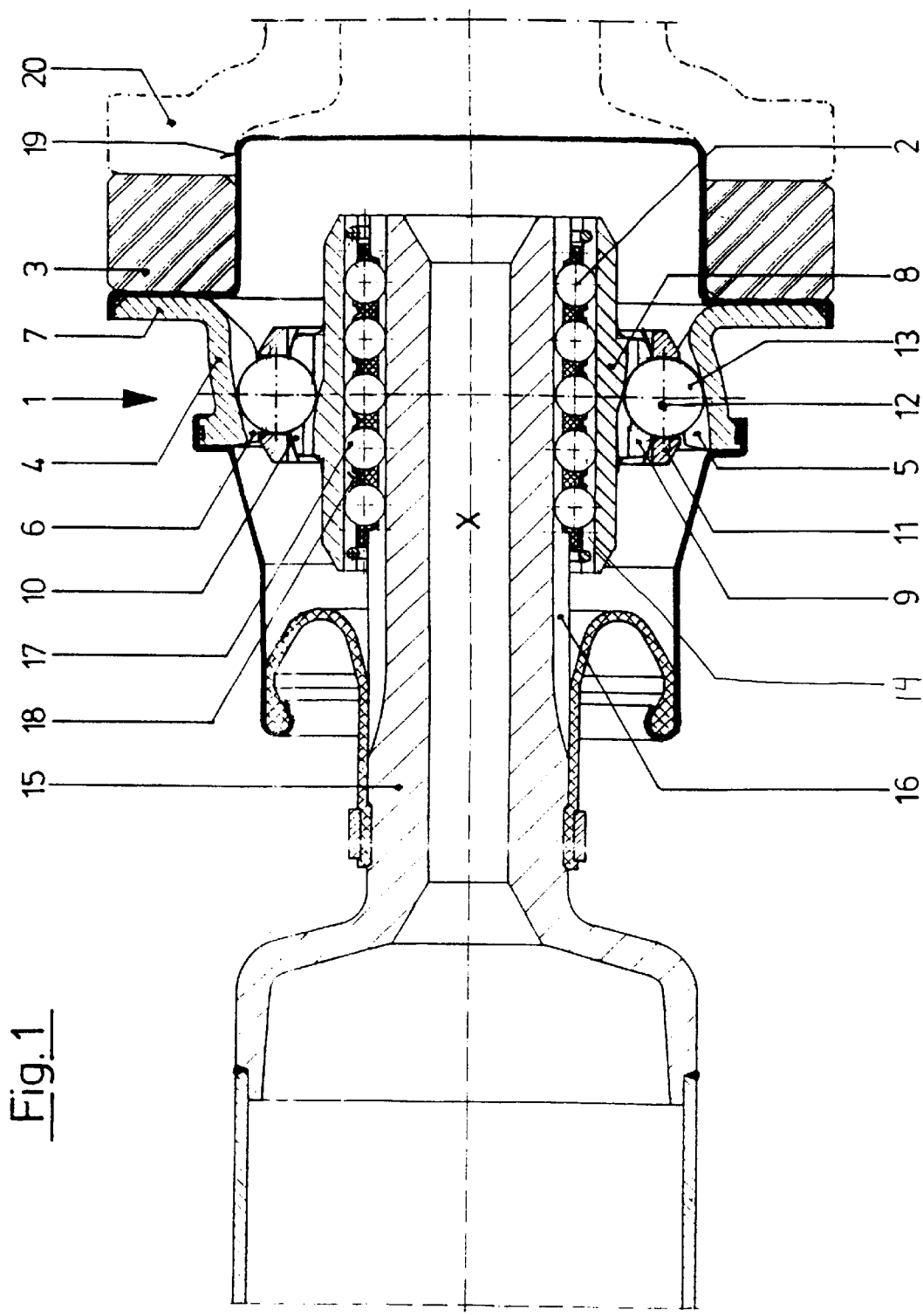
FIG. 1 is a longitudinal section through drive assembly according to one embodiment of the present invention which comprises a damping element in the form of a ring.

FIG. 1 shows a constant velocity fixed joint 1 in the aligned position, i.e. the components are aligned on the longitudinal axis X, so that the longitudinal axis X constitutes the longitudinal axis of all components.

The constant velocity fixed joint 1 is associated with the plunging unit 2 in the form of a rolling contact member plunging unit. Furthermore, a damping element 3 is connected to the constant velocity fixed joint 1. The constant velocity fixed joint comprises an outer part 4 in the form of a formed plate metal part which is continuously open. The inner face of the outer part 4 is provided with first running grooves 5 which are circumferentially arranged around the longitudinal axis X also constituting the longitudinal outer part axis. The groove 5 start from the open end of the outer part 4 removed from the damping element 3, extend in a curve-like and undercut-free way in the above-mentioned planes, and end in the region of the second open end which is positioned near the damping element 3.

Between each two circumferentially adjoining first outer running grooves 5, there is arranged a second outer running grove 6. The second outer running grooves 6 also extend in a curve-like and undercut-free way in planes distributed around the longitudinal axis X, but they start from the open end near the damping element 3 and end in the region of the open end of the outer part 4 which is removed from the damping element 3.

The cavity of the outer part 4 accommodates the inner part 8. The inner part 8, in its spherical outer face, is provided with first inner running grooves 9 extending in accordance with the first outer running grooves 5 and with second inner running grooves 10 extending in accordance with the second outer running grooves 6. One first outer running groove 5 and one first inner running groove 9 are thus arranged opposite one another and form a pair. The same applies to the second outer running groove 6 and the opposed second inner running grooves 10.

Between the inner face of the cavity of the outer part 4 and the outer face of the inner part 8, there is arranged an annular cage 11 which comprises an inner face which is at least partially hollow-spherical and by means of which the cage 11 is guided on the outer face of the inner part 8. The outer face of the cage 11 is arranged at a distance from the inner face of the cavity of the outer part 4.

Between the hollow-spherical inner face and the outer face of the cage 11, there are provided radial apertures which are arranged in accordance with the pairs of outer running grooves and inner running grooves and which form the windows 12. The windows 12 serve to accommodate balls 13. The balls 13 each engage an outer running groove 5, 6 and an inner running groove 9, 10 to be able to transmit torque between the outer part 4 and the inner part 8. The cage 11 serves to guide the balls 13, i.e. it holds same in the plane which halves the angle of articulation and into which they are guided as a result of the shape of the outer running grooves 5, 6 and of the inner running grooves 9, 10 when the inner part 8 is articulated relative to the outer part 4.

The inner part 8 is increased in length on both sides along the region containing the first inner running grooves 9 and the second inner running grooves 10 in the direction of the longitudinal axis X which, at the same time, constitutes the longitudinal axis of the inner part. In the entire region, the inner part 8 is provided with a continuous bore which is centered on the longitudinal axis X and which is provided with circumferentially distributed outer guiding grooves 14 which extend parallel to the longitudinal axis X. Said bore accommodates a sliding journal 15 which is associated with a connecting shaft and is displaceable along the longitudinal axis X which, at the same time, constitutes the longitudinal axis of the sliding journal. In its outer face, the sliding journal 15 is provided with inner guiding grooves 16 which are positioned opposite the outer guiding grooves 14 and which also extend parallel to the longitudinal axis X. A plurality of such outer guiding grooves 14 and inner guiding grooves 16 is distributed around the longitudinal axis X, with one outer guiding groove 14 and one opposed inner guiding groove 16 accommodating a plurality of guiding balls 17 which are arranged therein one behind the other and which are held by a guiding cage 18, thus permitting a transmission of torque between the sliding journal 15 and the inner part 8 on the one hand and a relative movement of same relative to one another along the longitudinal axis X.

In the region of the flange 7, the open end of the outer part 4 is closed by a cover 19 which comprises a flange-like portion which comes to rest against the flange 7. There then follows the damping element 3 in the form of a ring which is arranged on the cylindrical portion of the cover 19 and which, when the constant velocity fixed joint 1 is fitted, is attached between the flange 7 and the attaching part 20 and, respectively, between the flange portion associated with the cover and the attaching part 20 which, for example, is associated with a gearbox output of the front drive unit of a motor vehicle.

The outer part 4 of the constant velocity fixed joint 1 is connected to the attaching part 20 by bolts (not illustrated). The latter are circumferentially distributed around the flange 7 which, for this purpose, like the annular damping element 3, is also provided with through-bores. The bolts engage the threaded bores of the attaching part 20.

The damping element 3 consists of rubber reinforced by inserted steel rings. The outer part 4 and the further components, i.e. the inner part 8, the cage 11 and the balls 13 consist of a ferrous material. Furthermore, for sealing purposes, there is provided a sealing assembly arranged between the sliding journal 15 and the outer part 4 and comprising a resilient boot and a cap.

FIG. 2, in a simplified way, shows a different embodiment of the damping element. In the embodiment, according to FIG. 2, the damping element 3' is provided in the form of the cover for the outer part 4. It comprises an aluminum material. It is provided with a portion which is expanded flange-like and which comes to rest against the flange 7 and is arranged between the flange 7 of the outer part 4 and the attaching part 20. In this region, the flange-like portion of the damping element 3' comprises hollow-rivet-like projections 22 which extend axially, i.e. parallel to the longitudinal axis X and which extend through circumferentially distributed through-bores 21 in the flange 7 and, at the opposite end, are deformed to form a collar 24 which rests against the flange face facing away from the first flange face. The bore 23 in the region of the projection 22 allows the passage of bolts which can be threaded into corresponding threaded bores in the attaching part 20 for the purpose of producing a rotationally fast connection. The flange-like portion of the damping element 3' in the form of a cover rests against the contact face 25 of the flange 7 of the outer part 4.

FIG. 3 shows an embodiment wherein the damping element 3" is again provided in the form of cover; it is cup-shaped with a rim which rests against the flange 7 of the outer part 4. In this region, the flange 7 is provided with formed-on projections which are circumferentially distributed and which extend into the bores 21. The damping element 3" is secured to the flange 7 by bolts 27. Only some of the bores 21 in the flange 7 are occupied by bolts 27. The bolts 27 engage the threaded bore 26 of the flange-like portion of the damping element 3". Furthermore, the flange-like portion of the damping element 3" comprises through-bores 29 which are arranged in accordance with the flange bores 21, with connecting bolts for securing the flange 7 and the outer part to the attaching part 20 being guided through said two bores 21, 29. However, said bolts are not shown. The damping element 3" comprises fiber-reinforced plastics for example. It is an injection-molded part, with carbon fibers being irregularly embedded in the base material of same.

Furthermore, it should be noted that it is advantageous to select for the damping elements 3, 3', 3" a material whose modulus of elasticity is clearly lower than that of the outer part 4 of the constant velocity fixed joint 1 and of the remaining components of same. Naturally, the attaching part 20, consists of a ferrous material (steel) as well.

What is claimed is:

1. A drive assembly comprising a constant velocity fixed joint (1) comprising:
    an outer part (4) including a longitudinal outer part axis (X), a cavity and, in the cavity, outer running grooves (5, 6) extending in planes which are distributed around the longitudinal outer part axis (X) and contain said axis, said outer part (4) further comprising a flange (7) to be connected to a driving or a driven attaching part (20);
    an inner part (8) is arranged in the cavity of the outer part (4) and which, in its outer face, comprises inner running grooves (9, 10) positioned opposite the outer running grooves (5, 6) and arranged in planes distributed around the longitudinal inner part axis (X) and containing said axis;
    a cage (11) arranged between the outer part (4) and the inner part (8) said cage is provided with windows (12) distributed in accordance with the pairs of opposed outer and inner running grooves (5, 9; 6, 10); and
    a plurality of balls (13) guided in the windows of the cage (11) and each extending into an associated outer running groove (5, 6) and inner running groove (9, 10);
    said outer part (4), inner part (8), cage (11), and balls (13) comprising a ferrous material, said drive assembly further comprising a passive damping element (3, 3', 3") comprising a material whose modulus of elasticity is smaller than that of the ferrous material and which is arranged in front of the flange (7) of the outer part (4) of the constant velocity fixed joint (1).

2. An assembly according to claim 1, wherein the passive damping element (3', 3") is provided in the form of a cover closing the outer part (4) on one side.

3. A drive assembly according to claim 1, wherein the passive damping element (3) is provided in the form of a ring.

4. A drive assembly according to any one of claims 1, 2, or 3, wherein the modulus of elasticity of the material used for producing the passive damping element (3, 3', 3") is less than 50% of the modulus of elasticity of the ferrous material.

5. A drive assembly according to claim 4, wherein the passive damping element (3, 3') comprises an aluminum material.

6. A drive assembly according to claim 4, wherein the passive damping element (3") comprises plastics.

7. A drive assembly according to claim 4, wherein the passive damping element (3) comprises a rubber ring including at least one reinforcing insert.

8. A drive assembly according to claim 1, wherein there is provided a plunging unit (2) with rolling contact members (17) which engage guiding grooves (14, 16).

9. A drive assembly comprising a constant velocity fixed joint (1) comprising:
    an outer part (4) including a longitudinal outer part axis (X), a cavity and, in the cavity, outer running grooves (5, 6) extending in planes which are distributed around the longitudinal outer part axis (X) and contain said axis, said outer part (4) further comprising a flange (7) to be connected to a driving or a driven attaching part (20);
    an inner part (8) is arranged in the cavity of the outer part (4) and which, in its outer face, comprises inner running grooves (9, 10) positioned opposite the outer running grooves (5, 6) and arranged in lanes distributed around the longitudinal inner part axis (X) and containing said axis;
    a cage (11) arranged between the outer part (4) and the inner part (8) said cage is provided with windows (12) distributed in accordance with the pairs of opposed outer and inner running grooves (5, 9; 6, 10);
    a plurality of balls (13) guided in the windows of the cage (11) and each extending into an associated outer running groove (5, 6) and inner running groove (9, 10);
    said outer part (4), inner part (8), cage (11), and balls (13) comprising a ferrous material, said drive assembly further comprising a passive damping element (3, 3', 3") comprising a material whose modulus of elasticity is smaller than that of the ferrous material and which is arranged in front of the flange (7) of the outer part (4) of the constant velocity fixed joint (1); and
    said drive assembly further comprising a cover (3', 3") closing the outer part (4) on one side, said cover including a rim which is arranged between the flange (7) of the outer part (4) and the driving or driven attaching part (20), said cover comprising a material whose modulus of elasticity is smaller than that of the ferrous material.

10. A drive assembly according to claim 9 wherein the modulus of elasticity of the cover is less than 50% of the modulus of elasticity of the ferrous material.

11. A drive assembly according to claim 9 wherein the flange (7) includes a plurality of circumferentially distributed bores (21) and the rim of said cover includes a plurality of circumferentially distributed projections (22) wherein each of said projections (22) extends through a respective bore (21) of the flange (7).

* * * * *